US008226777B2

(12) United States Patent
Gaus et al.

(10) Patent No.: US 8,226,777 B2
(45) Date of Patent: Jul. 24, 2012

(54) HEAT RECOVERY DEVICE WITH SELF-CLEANING

(75) Inventors: Bruno Gaus, Offenburg (DE); Joachim Kupetz, Berghaupten (DE); Denis Lehmann, Ortenberg (DE); Thomas Naeger, Offenburg (DE); Thomas Peukert, Buehl (DE); Vera Schneider, Offenburg (DE)

(73) Assignee: Meiko Maschinenbau GmbH & Co KG, Offenburg (DE)

( * ) Notice: Subject to any disclaimer, the term of this patent is extended or adjusted under 35 U.S.C. 154(b) by 484 days.

(21) Appl. No.: 12/412,341

(22) Filed: Mar. 26, 2009

(65) Prior Publication Data
US 2009/0250085 A1  Oct. 8, 2009

(30) Foreign Application Priority Data

Mar. 26, 2008 (DE) .......................... 10 2008 015 798

(51) Int. Cl.
*B08B 3/10* (2006.01)
(52) U.S. Cl. ..................... 134/56 D; 134/57 D; 134/108
(58) Field of Classification Search .................. 134/108, 134/56 D, 57 D, 10, 57 D5
See application file for complete search history.

(56) References Cited

U.S. PATENT DOCUMENTS

| 2,452,367 | A | | 10/1948 | Gangloff | |
|---|---|---|---|---|---|
| 3,261,764 | A | * | 7/1966 | Cullen | 202/187 |
| 3,850,741 | A | * | 11/1974 | Callahan et al. | 208/48 R |
| 4,033,407 | A | * | 7/1977 | Quintilliano | 165/95 |
| 4,373,572 | A | * | 2/1983 | Kaufmann | 165/139 |
| 4,505,758 | A | | 3/1985 | Carson | |
| 4,991,545 | A | * | 2/1991 | Rabe et al. | 122/382 |
| 5,110,418 | A | * | 5/1992 | Garrison et al. | 202/181 |
| 5,112,215 | A | * | 5/1992 | Frish et al. | 431/3 |
| 5,660,193 | A | | 8/1997 | Archer et al. | |
| 5,706,841 | A | * | 1/1998 | Werre et al. | 134/56 R |
| 6,706,196 | B2 | * | 3/2004 | Holland | 210/695 |
| 7,077,563 | B2 | * | 7/2006 | Xiao et al. | 374/29 |
| 7,585,374 | B2 | * | 9/2009 | Sechelmann | 134/18 |
| 2006/0144162 | A1 | * | 7/2006 | Batzinger et al. | 73/861.25 |
| 2008/0308127 | A1 | * | 12/2008 | Padtberg et al. | 134/18 |
| 2009/0044576 | A1 | * | 2/2009 | Moschutz | 68/5 |

FOREIGN PATENT DOCUMENTS

| CN | 1458491 | * | 11/2003 |
|---|---|---|---|
| DE | 31 05 927 | * | 8/1982 |
| DE | 229 207 A1 | | 10/1985 |
| DE | 35 34 624 | * | 11/1986 |

(Continued)

OTHER PUBLICATIONS

WIPO WO 99/24764 May 1999.*

(Continued)

*Primary Examiner* — Frankie L Stinson
(74) *Attorney, Agent, or Firm* — Muncy, Geissler, Olds & Lowe, PLLC (57) ABSTRACT

A heat recovery device is provided for recovering thermal energy from a fluid medium, in particular for use in a wastewater system of a dishwasher. The heat recovery device comprises at least one heat exchanger with at least one heat exchanger surface. The heat recovery device further comprises at least one heating device, which is thermally coupled to the heat exchanger surface, and also at least one controller. The controller is designed to carry out a self-cleaning process for the heat exchanger, with the heat exchanger surface being briefly heated by means of the heating device during the self-cleaning process.

11 Claims, 2 Drawing Sheets

FOREIGN PATENT DOCUMENTS

| | | | |
|---|---|---|---|
| DE | 281 452 A5 | | 8/1990 |
| DE | 295 21 413 U1 | | 4/1997 |
| DE | 10 2004 003 797 A1 | | 8/2005 |
| DE | 10 2005 050 305 B3 | | 6/2007 |
| DE | 10 2006 022 625 A1 | | 11/2007 |
| EP | 0 689 791 A1 | | 1/1996 |
| GB | 2 232 749 | * | 12/1990 |
| JP | 64-019250 | * | 1/1989 |
| JP | 03-199949 | * | 8/1991 |
| JP | 2007-117554 | * | 5/2007 |
| RU | 2 152 575 | * | 7/2000 |

OTHER PUBLICATIONS

H. Klein et al., "Wärmerückgewinnung in Grossküchen [Heat recovery in large-scale catering establishments]", Technische Rundschau, Bern, No. 10, Mar. 10, 1981, pp. 17 and 18.

* cited by examiner

HEAT RECOVERY DEVICE WITH SELF-CLEANING

This nonprovisional application claims priority under 35 U.S.C. §119(a) to German Patent Application No. DE 10 2008 015 798.8, which was filed in Germany on Mar. 26, 2008, and which is herein incorporated by reference.

BACKGROUND OF THE INVENTION

1. Field of the Invention

The invention relates to a heat recovery device for recovering thermal energy from a fluid medium. The invention further relates to a cleaning appliance which comprises a heat recovery device according to the invention, and also to a method for recovering thermal energy from a fluid medium. Such heat recovery devices and methods are used, in particular, in the field of commercial dishwashing in order to recover heat from waste water and/or exhaust air on a large scale. However, such heat recovery devices can also be used in other fields of technology.

2. Description of the Background Art

Cleaning appliances by means of which various types of washware can be cleaned with different objectives in view are known from the most diverse fields of technology and natural sciences. One objective is, for example, that of at least largely freeing the washware from adhering residues of dirt; another objective, which can be realized as an alternative or in addition, is that of sanitizing the washware, which can range as far as disinfecting the washware. Cleaning is generally performed by subjecting the washware to the action of at least one cleaning fluid which can comprise, for example, a liquid cleaning fluid (for example one or more washing liquids, for example water mixed with a detergent and/or a rinse aid) and/or a gaseous cleaning fluid, for example steam. The washware may be, for example, dishes, glasses, trays, cups, cutlery, medical equipment and/or care home equipment, containers, machine parts, motor vehicles, trains or other types of washware.

In many instances, a considerable quantity of thermal energy has to be applied in a cleaning appliance of this type. This thermal energy may be required directly during the cleaning process, for example since the cleaning fluid is applied to the washware at an elevated temperature. For example, rinsing liquids having a temperature of approximately 85° C. can be used for a rinsing operation in a dishwasher. A further example is the thermal energy which is required to generate the steam in steam sterilizers and/or steam disinfection appliances. Furthermore, cleaning appliances can also be designed in such a way that one or more drying steps are carried out. In the case of such drying, the washware can be subjected to the action of hot air, for which purpose thermal energy likewise has to be expended.

This outlay on thermal energy can be considerable in the commercial sector in particular, and so, for example, heating capacities can make a considerable contribution to the overall operating costs of the cleaning appliance. In commercial dishwashers, the heating capacities range, for example, from a few 10 kW to a few 100 kW, depending, for example, on the operating state and/or the design of the dishwasher.

In this respect, numerous approaches to reducing the energy requirement by recovering heat from waste water and/or exhaust air are known, in particular from the field of large-scale catering establishments. The basic concepts of this heat recovery are outlined, for example, in H. Klein and G. Lindner, Wärmerückgewinnung in Großküchen [Heat recovery in large-scale catering establishments], Technische Rundschau, Bern, no. 10, Mar. 10, 1981, pages 17 and 18. Heat exchangers and heat pumps, in particular, can be used for heat recovery.

In practice however, conventional heat recovery devices, in particular heat exchangers, have some disadvantages. For example, one considerable disadvantage is, in particular, that heat exchangers which are used to recover heat from exhaust air or waste water have soiling effects. Accordingly, such heat exchangers and/or heat recovery devices generally have to be serviced at regular intervals since, in particular, the efficiency of the heat exchange process falls as the level of soiling increases. However, these servicing operations are undesirable and expensive since, in particular, continuous operation for commercial use has to be interrupted for such servicing operations. In addition, a large number of heat exchangers are of such complex construction that straightforward and satisfactory cleaning cannot be carried out on site in all cases.

Various systems in which heat exchanger surfaces are automatically cleaned are therefore known from the prior art. DE 10 2005 050 305 B3, for example, discloses a dishwasher with an integrated cleaning apparatus for a heat exchanger and/or a heat pump for handling vapors and an apparatus for supplying vapors to the heat exchanger and/or to the heat pump. In this case, the integral cleaning apparatus is designed in such a way that the heat exchanger and/or the heat pump are regularly washed with a cleaning fluid. DE 295 21 413 U1 also discloses an operational cooling device cleaning system in which a cooling or heating device can be cleaned automatically by means of movable cleaning nozzles.

However, the heat exchangers or heat recovery devices with self-cleaning apparatuses which are known from the prior art, in particular from DE 10 2005 050 305 B3, have considerable disadvantages, in particular for use in commercial dishwashers, but also in other fields of heat recovery. For example, self-cleaning heat exchangers as described in DE 10 2005 050 305 B3 can be used either only for self-cleaning heat exchangers for heat recovery from exhaust air, or cleaning or operation of the heat exchanger has to be interrupted for the self-cleaning process. In particular, the spray nozzle principle of self-cleaning cannot be used for heat exchangers which are to be used in the field of heat recovery from waste water.

An additional complicating factor is that, in particular in the field of commercial dishwashers, exhaust air and waste water in many cases comprise high proportions of vegetable or mineral fats and/or oils. Since the heat exchanger surfaces need to be cooled, as a matter of principle, for the best possible transfer of heat to the heat exchanger surfaces of the heat exchanger, fat builds up on these heat exchanger surfaces in many cases since fats which are dissolved and/or emulsified in waste water or fatty components which are contained in the exhaust air accumulate on the heat exchanger surfaces and at least partially solidify there. This formation of layers of fat on the heat exchanger surfaces which occurs as a matter of principle adversely affects heat transfer and therefore adversely affects functioning of the heat recovery devices. The described spray methods, for example the self-cleaning described in DE 10 2005 050 305 B3, can remove hardly any such fatty impurities in practice, or the use of aggressive detergents is required, and this would again lead to increased pollution of the environment. The problem is even greater in the case of heat recovery devices which are to be used in waste-water systems since it is extremely difficult here to wash the heat recovery device, in particular the heat exchanger plates, with a cleaning fluid which dissolves fats and other impurities in practice.

SUMMARY OF THE INVENTION

The object of the present invention is therefore to provide a heat recovery device and a method for recovering heat, which device and method at least largely avoid the above-described disadvantages of known heat recovery devices and known methods. A particular intention is for the heat recovery device to permit virtually servicing-free continuous operation, with use in a waste-water system through which fat-containing, liquid media flow also being possible.

The invention is based on the basic idea that, in particular for use in heat recovery systems for recovering heat from waste water, fatty impurities can be eliminated by the brief introduction of heat into the otherwise cold heat exchanger surfaces. In the process, the impurities are melted or at least deformed and can thus be easily removed by, for example, the waste water flowing past the heat recovery device or through this heat recovery device. Cleaning can also be performed in this way for heat recovery devices used in other fluid media, for example heat recovery devices in exhaust-air streams of dishwashers, since molten impurities can, for example, be washed away more easily or can drain completely, for example, into a collection container or another disposal system.

The invention therefore proposes a heat recovery device for recovering thermal energy from a fluid medium, which heat recovery device can be employed, in particular, for use in a waste-water system of a dishwasher. However, as described above, the heat recovery device can also be used in other fluid media, for example exhaust-air streams, or in other types of cleaning appliances. In general, the field of application is to be seen as that in which fluid media at a temperature which is elevated compared to the ambient temperature occur and would normally escape in unused form, that is to say, for example, in exhaust air, waste water or other disposal systems.

The proposed heat recovery device comprises at least one heat exchanger with at least one heat exchanger surface. With regard to the design of the heat exchanger, use can be made of virtually all known heat exchanger technologies, that is to say, for example, plate heat exchangers with heat exchanger plates through or across which a cooling or transportation medium flows, non-fluid-cooled heat exchanger plates, lamella heat exchangers, cooling-coil heat exchangers or similar known heat exchangers.

In order to implement the above-described idea of the invention, the heat recovery device further comprises at least one heating device which is thermally coupled to the heat exchanger surface and is designed to heat the at least one heat exchanger surface at least briefly to a cleaning temperature. This cleaning temperature may be, for example, above 50° C. or 60° C., in particular above 80° C., and can be matched to the impurities to be expected. The heating temperature can be monitored by additional temperature sensors.

The heat recovery device further has at least one controller which is designed to carry out a self-cleaning process for the heat exchanger. As described above, the heat exchanger surface is briefly heated by means of the heating device, for example to the abovementioned temperatures, during the self-cleaning process. However, higher or lower temperatures are also possible, for example temperatures above 90° C. or 100° C. As described above, the layer of impurities is preferably melted or at least softened by the action of heat during the self-cleaning process for the heat exchanger, and so said layer of impurities can be removed more easily. Additional media, in particular the fluid medium itself, can then actually remove the impurity.

The at least one controller can comprise, for example, one or more electronic components. For example, the controller can also comprise at least one data processing device, in particular at least one microcomputer, that is to say, in particular, a processor, and possibly one or more non-volatile or volatile memories, input and output devices, interfaces or the like.

The proposed heat recovery device therefore permits rapid and efficient self-cleaning, without the operation of the appliance or a surrounding area in which the heat recovery device is used having to be influenced by the self-cleaning process. In particular, a washing mode of a dishwasher or another type of cleaning mode, for example, can be continued without interruption, with heat recovery being reduced or stopped only during the self-cleaning process. In this case, "brief" is to be understood as a self-cleaning process which is carried out for, for example, between 30 seconds and 3 hours, but preferably in the region of a few minutes (for example 1 to 30 minutes). However, shorter or longer self-cleaning processes are possible in principle and are intended to be covered by the term "brief". The term "brief" therefore means only that the heating device is not operated continuously, so that the overall function of heat recovery is not significantly interrupted by the self-cleaning process.

The heating device used may, in principle, be any desired type of heating device which can include, for example, resistive heating devices and/or infrared heating devices and/or other types of heating devices. However, it is particularly preferred to couple the heat exchanger of the heat recovery device to a heat pump, as is described, for example, in H. Klein and G. Lindner, Wärmerückgewinnung in Großküchen [Heat recovery in large-scale catering establishments], Technische Rundschau, Bern, no. 10, Mar. 10, 1981, pages 17 and 18. In this context, a heat pump is to be understood as a "raising apparatus" which is designed to raise any medium from a relatively low temperature level to a higher temperature level. In this case, in contrast to conventional heat pumps which are not reversible, the intention within the scope of the present invention is preferably for it to be possible for the thermodynamic process to also be reversed by the heat pump. This means, in particular, that a heat pump can draw heat from a first medium in order to supply this heat to a second medium, with the heat pump being supplied with energy (for example mechanical and/or electrical energy) from an external source.

Combination of the heat exchanger with the heat pump provides the considerable advantage that the comparatively low temperatures which usually occur during heat recovery can be compensated. Customary waste-water temperatures, for example, are therefore approximately 60° C. in the field of commercial dishwashers. Even in the event of complete transfer of this temperature to a transportation medium, for example a rinsing liquid, this temperature is generally not sufficient for expedient utilization in the dishwasher itself, and so additional heating would be required. By virtue of the interposition of a heat pump, the transportation medium, for example a cleaning fluid which is used in a cleaning appliance and is heated in advance by means of the heat drawn from the fluid medium, can preferably be heated to a target temperature, for example a temperature of between 80° C. and 90° C., which can be used, for example, in a rinsing process.

As described above, the "pumping direction" of heat pumps can therefore be reversed. According to the invention, this effect is used in a preferred refinement. Therefore, the heat pump can pump in the above-described direction, for example in a normal mode, in order to additionally heat the transportation medium. During the self-cleaning process in contrast, the heat pump can be reversed and then act as a heating device in order to heat the at least one heat exchanger surface. Operation of the heat pump can, for example, likewise be controlled by the controller, for example by a corresponding automatic programming system.

In this way, the advantages of the invention, namely self-cleaning by means of the brief introduction of heat and as a result the elimination of, in particular, fat impurities, can be combined with the advantages of heat pump coupling, by means of which the recovered thermal energy can be raised to a usable temperature level. Additional heating elements can be dispensed with in this case.

Most of the known types of heat pumps, for example compression heat pumps or similar types of heat pumps, can, in principle, be used within the scope of this refinement of the invention. However, it is particularly preferred when thermoelectric heat pumps are used, in particular heat pumps which comprise at least one Peltier element. Peltier elements are electrothermal converters (or thermoelectric heat pumps) which are based on the Peltier effect and, when current flows through them, create a temperature difference between a heat-intake side and a heat-dissipation side. Peltier elements are also heat pumps in the sense of the above definition since, in the event of the current flow being reversed, the functions of the heat-intake side and the heat-dissipation side are generally interchanged, so that the previously cooling side now becomes the heating side. In this respect, Peltier elements which can be realized in a simple and cost-effective manner and which can be used in any desired large number of geometries and which can create temperature differences of up to approximately 70° C. can be used to advantage in the above-described heat recovery device. In particular, the heat recovery device and/or the controller can be designed to electrically reverse the polarity of the Peltier element during the self-cleaning process.

The above-described self-cleaning process can be carried out, for example, at predefined times and/or at regular or irregular intervals and/or as part of a cleaning program (for example before and/or after and/or during a cleaning program). However, it is particularly preferred when the heat recovery device is designed in such a way that it can react to instances of soiling in a targeted manner. The heat recovery device can, in particular, comprise at least one dirt sensor for detecting a degree of soiling of the heat exchanger surface. The controller may then be designed, in particular, to carry out the cleaning process, in particular to automatically carry out the cleaning process, when a predefined degree of soiling is reached or exceeded. However, instead of automatically carrying out the cleaning process, a warning that a self-cleaning process should now be carried out may, for example, also be output to a user.

Numerous dirt sensors, which are known from the field of dishwashing or washing in particular, can be used to detect the dirt or the degree of soiling. Examples of sensors which can be used are, for example, optical dirt sensors, in particular infrared sensors, turbidity sensors, absorption sensors, reflection sensors or similar types of sensors. As an alternative or in addition, electrical dirt sensors can also be used, for example dirt sensors which are based on an electrical resistance measurement. Furthermore, capacitive dirt sensors can also be used as an alternative or in addition, since, for example, a layer of dirt on heat exchanger plates leads to a change in the capacitance of these heat exchanger plates. Various other principles of the dirt sensors are feasible.

However, as an alternative or in addition to the said sensor principles, it is particularly preferred when at least two temperature sensors are used as dirt sensors. For example, the temperature sensors can be designed in such a way that they detect a temperature of the fluid medium before and after the medium flows through and/or across the heat exchanger. If the level of soiling on the heat exchanger plates rises, the efficiency of the heat exchanger falls, and the temperature difference before and after the medium flows through the heat exchanger falls. It is therefore possible, in this way, to likewise effectively detect dirt, and a self-cleaning process can be initiated, for example, automatically.

In an extension to the abovementioned principle, temperature differences, for example between the fluid medium flowing into the heat recovery device and a temperature of a transportation medium, can also be determined after the medium flows through the heat recovery device. The principle is then in each case based on a quantity of heat and/or a heating capacity which is transmitted by the fluid medium to the heat exchanger and/or a transportation medium which is thermally coupled to the heat exchanger being detected, and a conclusion being drawn about a degree of soiling of the heat recovery device, in particular the heat exchanger, from this transferred quantity of heat or heating capacity. If the measured degree of heat transfer falls, it can be concluded that the level of soiling is increasing.

In addition to the described heat recovery device, the invention further proposes a cleaning appliance for cleaning at least one item of washware, which cleaning appliance comprises at least one heat recovery device according to the above-described principle. The cleaning appliance can comprise, in particular, at least one dishwasher for cleaning washware, but it is also possible to use other types of cleaning appliances. In addition to dishwashers, in particular manual cleaning systems, cleaning appliances for cleaning hospital and/or care home equipment and also medical instruments, cleaning devices for cleaning machine parts, car wash systems or the like may also be included or covered by the term "cleaning appliances". In this case, the heat recovery device can be used to recover heat from gaseous and liquid fluid media. As described above, it is particularly preferred to use the heat recovery device in areas where fat- and/or oil-containing fluid media are discharged. In this field, particular mention may be made of the commercial conveyor-type dishwashers with at least two cleaning zones through which the washware runs in succession, and/or single-chamber dishwashers for commercial use which comprise at least one tank, in particular a boiler, which is separate from the cleaning chamber. However, other types of cleaning appliances, which comprise at least one cleaning chamber for subjecting the washware to the action of at least one cleaning fluid, are also possible.

The proposed cleaning appliance comprises, in addition to the heat recovery device, at least one waste-water system for discharging spent cleaning fluid. This discharge process can be performed, for example, in a disposal tank and/or a network, for example a waste-water network. The waste-water system can comprise, for example, one or more tanks, pipes or the like, depending on the type of cleaning fluid. The heat recovery device is thermally coupled to the waste-water system and is designed to supply heat which is recovered in accordance with the above-described principle back to a cleaning process.

It should be noted that the heat recovery device according to the invention can also be used at other points in the cleaning appliance in addition to the waste-water system. For example, as an alternative or in addition to the arrangement in the waste-water system, the cleaning appliance can therefore further comprise the heat recovery device in an exhaust-air system. The heat recovery device can be used advantageously here too.

The term "waste-water system" can be broadly interpreted here and relates to any type of system which is suitable for discharging or disposing of spent cleaning fluid. The spent cleaning fluid can be fed, for example continuously or in cycles, to the heat recovery device and therefore flow continuously or in cycles, for example, through or across the heat recovery device.

It is particularly preferred when the cleaning appliance comprises at least one rinsing system for subjecting the washware to the action of at least one rinsing liquid. This rinsing system may be used, for example, as a system, which is connected downstream of at least one pre-washing system, in a conveyor-type dishwasher and/or can be designed in a single-chamber dishwasher as a separate system which is switched or turned on in a rinsing step. The rinsing fluid may be, for example, an aqueous fluid or water with which one or more additives, in particular a rinse aid, can be mixed if desired. Rinsing fluids of this type are used, for example, in dishwashers in a temperature range of between 80° C. and 90° C., in particular at 85° C., so that the return of recovered heat is particularly advantageously noticeable in this region in particular. The heat recovery device can be used to recover heat from the spent cleaning fluid and transfer it to the rinsing fluid. This can be performed, for example, by a transportation fluid flowing through the heat recovery device, it being possible for this transportation fluid to also be the rinsing fluid and/or the cleaning fluid itself. This transportation fluid can then be used to convey the heat, for example, to a rinsing tank and/or a boiler and/or said heat can be supplied directly to a rinsing nozzle system of the rinsing system. Instead of indirect heat transfer by means of a transportation fluid, heat can naturally also be transferred indirectly, for example, to the rinsing fluid, for example by the heat recovery device being directly coupled to a pipeline system and/or a tank (for example a rinsing tank and/or a boiler) of the rinsing system. In this case, the rinsing fluid takes over the role of the transportation fluid.

In addition to the proposed heat recovery device and the cleaning appliance, in each case in one of the above-described embodiments, a method is further proposed for recovering thermal energy from a fluid medium, which method should be suitable, in particular, for operation of a cleaning appliance according to the above description and/or a heat recovery device according to the above description. In this respect, reference may be made, for example, to the above description for possible heat recovery devices and their designs.

In the method, heat is drawn from a fluid medium by means of at least one heat exchanger with at least one heat exchanger surface in a normal mode. In addition to the normal mode (that is to say at the same time, with a time delay or at different times, for example in different program cycles), a self-cleaning process is carried out, in which the heat exchanger surface is briefly heated, with impurities having to be at least partially removed from the heat exchanger surface. As demonstrated above, this removal can be performed, for example, by means of melting and/or softening these impurities. The removed impurities can, for example, be dissolved and/or dispersed and/or emulsified in the fluid medium and/or be washed away by the fluid medium.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
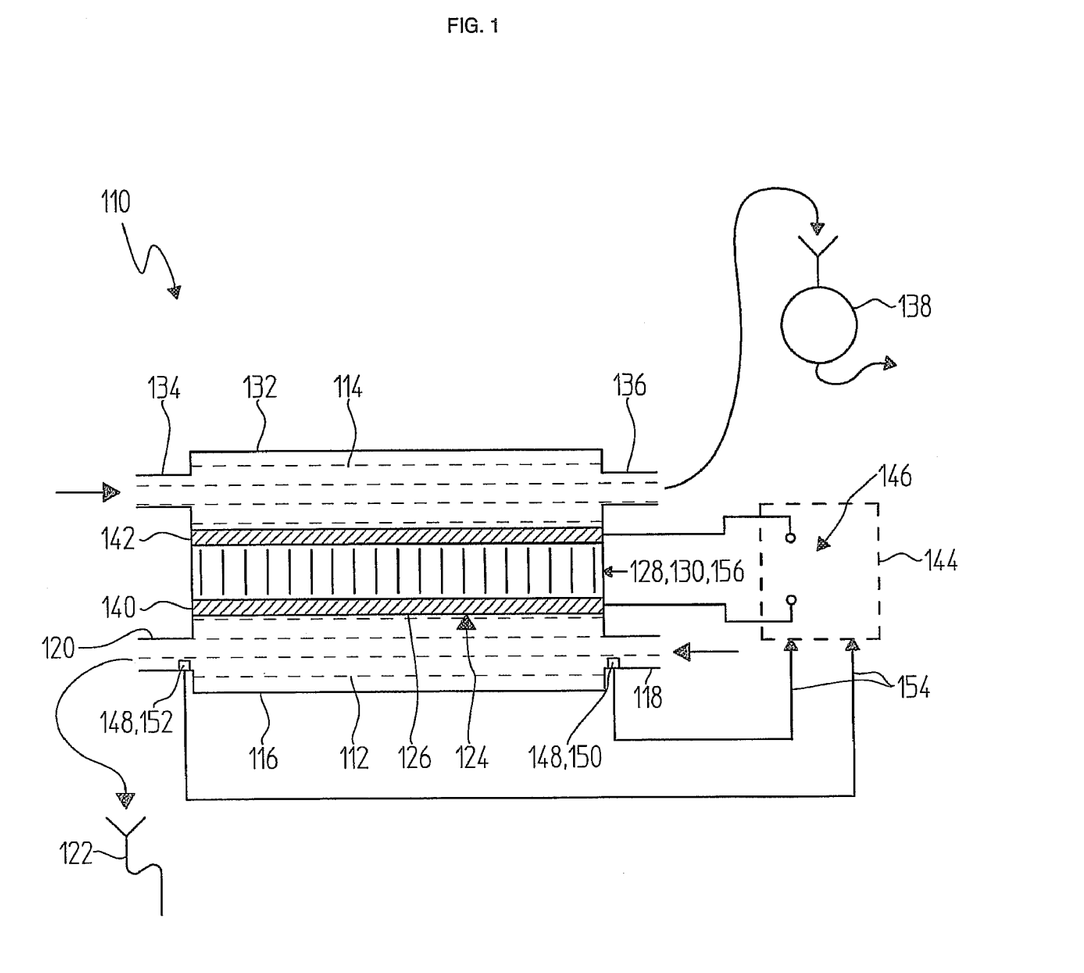
FIG. 1 shows one possible exemplary embodiment of a heat recovery device according to the invention with a Peltier element.

FIG. 1 illustrates one possible exemplary embodiment of a heat recovery device 110 according to the invention. This heat recovery device 110, which could be used in cleaning appliances for example, serves to recover heat from a fluid medium 112, of which it is assumed in the text which follows that it should be a spent cleaning fluid, in particular washing water containing cleaning additives and impurities. The recovered heat should be transferred to a transportation medium 114. To this end, the heat recovery device comprises a first chamber 116 with a first inlet 118 and a first outlet 120, it being possible for the first inlet 118 to be connected, for example, to an outflow of a dishwasher, and it being possible for the first outlet 120 to be connected, for example, to an outflow 122. In this case, the first chamber 116 is illustrated only symbolically in FIG. 1 and here comprises, for example, an expanded chamber, but with other designs also being possible, for example s-shaped or meandering guides of the fluid medium, flow through a plurality of individual chambers which can be arranged parallel or one behind the other, or similar apparatuses which permit optimum heat transfer.

The heat recovery device 110 further comprises a heat exchanger 124 with a heat exchanger surface 126. The heat exchanger surface 126 and the heat exchanger 124 are likewise indicated only symbolically in FIG. 1 since the heat exchanger surface 126 can also assume more complex forms (for example lamella forms etc.). In addition, the heat exchanger surface 126 is drawn as an upper surface of the first chamber 116 in this exemplary embodiment. However, other designs of the heat exchanger 124 are also possible, for example jacket-flow heat exchangers or coaxial heat exchangers in which the heat exchanger surface 126 virtually completely surrounds the first chamber 116.

In addition to the heat exchanger 124, the heat recovery device comprises, in the exemplary embodiment which is illustrated in FIG. 1, a heat pump 128 in the form of a Peltier element 130. This Peltier element 130 connects the first chamber 116 to a second chamber 132 which has a second inlet 134 and a second outlet 136. The transportation medium 114 flows through this second chamber 132. Whereas the second inlet 134 of the second chamber 132 is connected, for example, to a fresh-water feed, the second outlet 136 can be connected, for example, to a tank 138 of a cleaning appliance, for example a dishwasher. This tank 138 may be, for example, a fresh-water tank and/or a rinsing tank and/or a boiler. Direct return of the transportation medium 114 to the cleaning appliance, without the interconnection of a tank 138, is also feasible.

In the exemplary embodiment illustrated in FIG. 1, the Peltier element 130 acts as a heat pump 128. Heat is absorbed by the fluid medium 112 and given off to the transportation medium 114 at a higher temperature level via the heat exchanger surface 126. In this "normal mode", the first side 140 of the Peltier element which faces the first chamber 116 acts as a side which absorbs heat and the second side 142 of the Peltier element which faces the second chamber 132 acts as a side which gives off heat. The Peltier element 130 is connected to a controller 144 which comprises a current source 146 which establishes such a "polarity" of the Peltier element 130 in the normal mode.

In this normal mode of the Peltier element 130 or of the heat pump 128, the heat exchanger surface 126 is therefore cooled by the Peltier element 130. The temperature of the transportation medium 114 can be set, for example to a specific final temperature of the transportation medium 114, for example a final temperature of 80 to 90° C., by correspondingly setting and designing the Peltier element 130.

However, on account of the low temperature of the heat exchanger surface 126, this heat exchanger surface 126 tends to become dirty, in particular fatty impurities tend to accumulate since fats have a comparatively high melting point. However, as impurities accumulate on the heat exchanger surface 126 in this way, the coefficient of heat transfer of this heat exchanger surface 126 falls, as does the efficiency of heat transfer from the fluid medium 112 to the transportation medium 114.

In the exemplary embodiment illustrated in FIG. 1, the heat recovery device 110 therefore comprises two dirt sensors 148 which, in this exemplary embodiment, are in the form of a first temperature sensor 150 at the first inlet 118 of the first chamber 116 and a second temperature sensor 152 at a first outlet 120 of the first chamber 116. These temperature sensors 150, 152 are connected to the controller 144 via signal lines 154. The temperature difference between the first inlet 118 and the first outlet 120 is a measure of the quantity of heat which is transmitted to the heat exchanger 124 and therefore to the transportation medium 114. Therefore, if the absolute temperature difference falls below, for example, a predefined threshold, the controller 144 can identify, for example, that the level of soiling of the heat exchanger surface 126 has reached a critical value.

The controller 144 can then switch over to a cleaning process in which the Peltier element 130 is used as a heating device 156. To this end, the polarity of the current source 146, which supplies the Peltier element 130 with current, is reversed, so that the first side 140 of the Peltier element 130 now acts as the surface which gives off heat and the second side 142 of the Peltier element 130 acts as the surface which absorbs heat. The flow of the fluid medium 114 can, for example, be suppressed during this cleaning process, for example by corresponding valve switching in order to prevent cooled transportation medium 114 being supplied to the tank 138.

This brief heating of the first side 140 of the Peltier element 130 preferably leads to the impurities on the heat exchanger surface 126 melting. These impurities, which were detached from the heat exchanger surface 126 in this way, can be washed away, for example, by the fluid medium 112. The self-cleaning process can be carried out, for example, for a predefined time period or can also be actively monitored, for example by dirt sensors 148 actively measuring the degree of soiling of the heat exchanger surface 126 and terminating the self-cleaning process when a predefined level of cleanliness of this heat exchanger surface 126 is reached. A changeover can then be made to the normal mode, for example again by reversing the polarity of the current source 146 of the Peltier element 130. In this way, a self-cleaning process for the heat recovery device 110 can be carried out in an efficient and rapid manner and without any outlay on servicing, for example in an automated manner.

Figure 2:
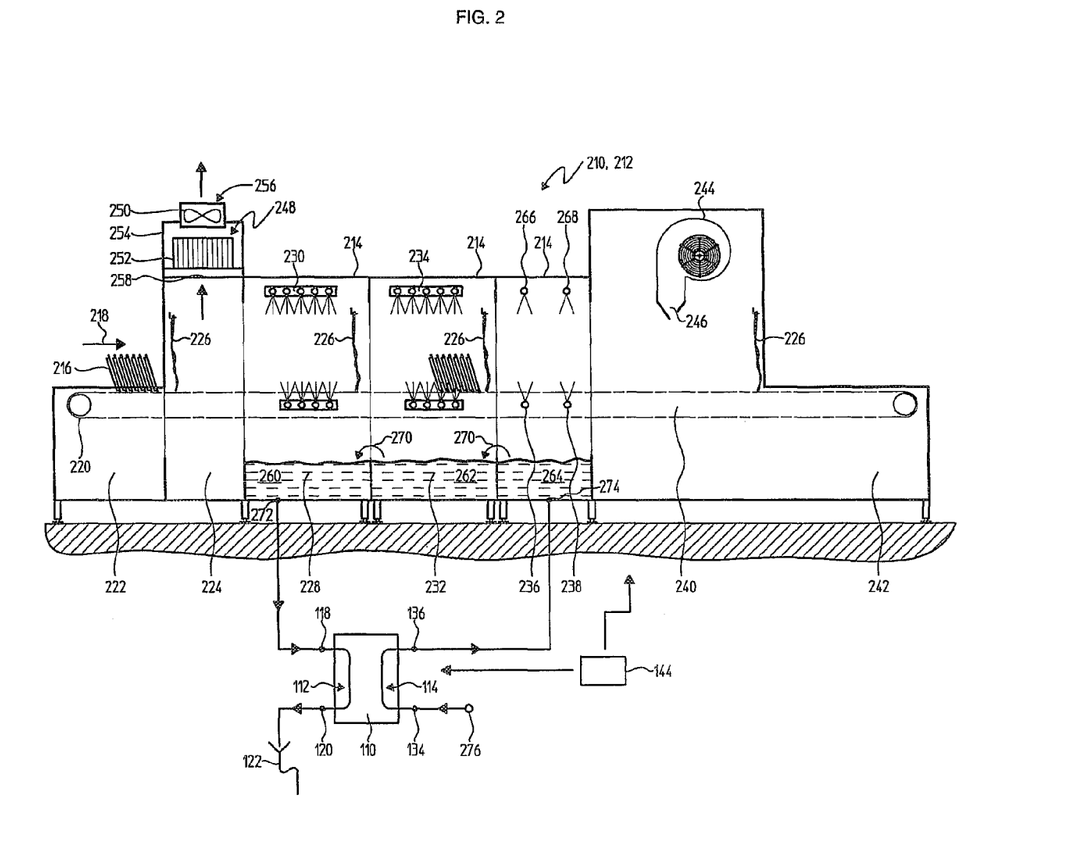
FIG. 2 shows an exemplary embodiment of a conveyor-type dishwasher having a heat recovery device according to the invention.

FIG. 2 illustrates one possible exemplary embodiment of a cleaning appliance 210 according to the invention in which the heat recovery device 110 according to the invention can be used. In this exemplary embodiment, the cleaning appliance 210 is designed as a conveyor-type dishwasher 212 and comprises a plurality of cleaning chambers 214 through which washware 216 runs in a passage direction 218. In the illustrated conveyor-type dishwasher 212, the washware 216 is transported by means of a conveyor belt 220. The conveyor-type dishwasher 212 is therefore designed as a belt-conveyor dishwasher in this exemplary embodiment. However, other designs are also possible, for example rack-conveyor dishwashers. Reference can be made largely to DE 10 2004 003 797 A1 for information regarding the structure and manner of operation of the conveyor-type dishwasher 212.

At an inlet 222, washware 216 which is received at the top end of the conveyor belt 220 enters an inlet tunnel 224. The inlet tunnel 224 is screened from the outside by means of a separating curtain 226 in order to prevent steam vapors in the region of the inlet tunnel 224 of the conveyor-type dishwasher 212 escaping. After the washware 214 which is received at the top end of the conveyor belt 220 has passed the inlet tunnel 224, it enters the cleaning chambers 214 which are divided into a plurality of cleaning zones. The washware 216 is initially transported into a pre-washing zone 228. A pre-washing system 230 is arranged within the pre-washing zone 228. The pre-washing system 230 has spray pipes which are arranged on the lower face and, respectively, above the revolving conveyor belt 220. The pre-washing system 230 is supplied with cleaning fluid, depending on the degree of soiling of the washware 216, via a pump (not illustrated in FIG. 2) whose power can be controlled. The pre-washing zone 232 is separated from a following washing zone 232 by means of a further separating curtain 226. After passing the pre-washing zone 228, the washware 216 enters the washing zone 232. The washing zone 232 likewise comprises a washing system which is denoted by reference symbol 234. The washing system 234 is arranged above and below the lower face of the revolving conveyor belt 220.

The washing zone 232 is separated, by a further separating curtain 226, from a pump-action rinsing zone 236 which has a washing system which is arranged above and below the top face of the conveyor belt 220 and is in the form of two spray pipes which are opposite one another. The pump-action rinsing zone 286 is followed by a fresh-water rinsing zone 238. The washware 216 is rinsed with fresh water within the fresh-water rinsing zone 238 in order to remove any remaining impurities or the previously applied cleaning fluid from the washware before said washware enters a drying zone 240. Connected downstream of the fresh-water rinsing zone 238 is a further separating curtain 226 (not illustrated in FIG. 2) which separates the fresh-water rinsing zone 238 from the drying zone 240.

A drying blower 244 is located within the drying zone 240 which has a removal section 242 connected downstream. The drying blower 244 takes in air and heats this air. The air which is heated in the drying blower 244 enters an outlet funnel 246 which has at its lower end an outlet nozzle which directs the emerging drying air onto the washware 216 passing through the drying zone 244. In the passage direction 218, the drying zone 244 is screened from the removal section 242 by means of a further separating curtain 226.

The temperature of the washware 216 increases continuously as said washware is transported through the conveyor-type dishwasher 212 illustrated in FIG. 2. In the pre-washing zone 228, the temperature of the washware 216 rises from room temperature, for example, to a temperature of 40° C. to 45° C., in accordance with the temperature of a pre-washing fluid. In the following washing zone 232, the temperature rises to approximately 55 to 65° C., and in the following pump-action rinsing zone 236 or fresh-water rinsing zone 238 rises to a temperature of between 60° C. and 85° C., in accordance with the rinsing fluid used there.

In order to recover heat from steam vapors which form in the cleaning chambers 214, the conveyor-type dishwasher 212 in the exemplary embodiment illustrated in FIG. 2 has an exhaust-air heat recovery device 248 which comprises a blower 250 and a lamella heat exchanger 252. Both elements are arranged in a shaft 254 which issues into an exhaust-air opening 256, in the region of which the blower 250 is arranged. In this exemplary embodiment, the shaft 254 is arranged in the region above the inlet tunnel 224. The blower 250 which is associated with the exhaust-air heat recovery device 248 generates a vacuum within the conveyor-type dishwasher 212, which vacuum allows an exhaust-air stream to be extracted by suction at a suction-extraction point 258. The exhaust-air heat recovery device 248 can be used firstly to effectively suppress the formation of vapors in the area surrounding the conveyor-type dishwasher 212, and heat can be recovered from the exhaust-air stream and fed back, for example, to the conveyor-type dishwasher 212.

The individual zones of the conveyor-type dishwasher 212 each have associated tanks 260, 262 and 264. In circulation mode, the pre-washing system 230 is fed from a pre-washing tank 260. Likewise in circulation mode, the washing system 234 is fed from a washing tank 262, and the pump-action rinsing system 266, which is associated with the pump-action rinsing zone 236, is fed from the rinsing tank 264 in circulation mode. In contrast, the fresh-water rinsing system 268 which is associated with the fresh-water rinsing zone 238 is fed by heated fresh water. In this case, the temperature within the tanks 260, 262 and 264 increases in the passage direction 218, for example, as described above, from approximately 40 to 45° C. to approximately 80 to 90° C. In the process, the degree of cleanliness of the washing fluid within these tanks 260, 262, 264 in the passage direction 218 simultaneously decreases. Each of the tanks 260, 262 and 264 or individual ones of these tanks can have its own circulation system, with, for example, the washing fluid being continuously circulated within these tanks 260, 262, 264 via a filter, in order to maintain a certain level of cleanliness in these tanks 260, 262, 264. Furthermore, as indicated in FIG. 2, a cascade overflow 270 can occur, so that clean washing fluid can in each case overflow from the tank which is arranged downstream in the passage direction 218 to the preceding tank.

Furthermore, FIG. 2 symbolically illustrates how a heat recovery device 110, for example the heat recovery device 110 illustrated in FIG. 1, can be used to recover heat from the waste water of the conveyor-type dishwasher 212. To this end, a drain 272 of the conveyor-type dishwasher 212, for example a drain 272 which is connected to the pre-washing tank 260, can be connected to the first inlet 118 of the heat recovery device 110. The first outlet 120 of this heat recovery device 110 is then connected to an outflow 122. The second outlet 136 of the heat recovery device 110 is connected to an inlet 274 of the rinsing tank 264, so that heated water or washing fluid can flow back into the rinsing tank 264 from the heat recovery device 110. In this case, the second inlet 134 of the heat recovery device can be connected directly or indirectly (that is to say, for example, via a heating device, for example a flow heater) to a fresh-water feed 276 for example, as illustrated in FIG. 2. As an alternative or in addition, this second inlet 134 can also be connected to an outlet of the rinsing tank 264, so that rinsing liquid can be conducted, for example in the circulation mode, through the second chamber 114 of the heat recovery device 110. Fresh water can then be fed, for example, via the fresh-water rinsing system 268 which can be connected directly or indirectly to a fresh-water feed 276.

Furthermore, a controller 144 is again provided, which can, for example, exercise the above-described functions of monitoring a self-cleaning process of the heat recovery device 110. This controller 144 can also be entirely or partially combined with a central controller of the conveyor-type dishwasher 212, but may also be formed decentrally from this.

In this way, the illustrated conveyor-type dishwasher 212 can efficiently use and at least partially recycle both the waste heat of the exhaust air and also the waste heat of the washing liquids. The illustrated conveyor-type dishwasher 212 is therefore extremely energy-efficient and environmentally friendly. It should be noted that the heat recovery device 110 can also be used in designs other than the embodiment illustrated in FIG. 2, for example in the form of a pipe system which differs from the pipe system illustrated in FIG. 2. Furthermore, pumps, valves or the like (not illustrated) can be accommodated in the fluid system, it being possible for said elements to also be controlled again by the controller 144 in order to control the heat recovery process and/or the self-cleaning process in the most efficient and smooth manner possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat recovery device for recovering thermal energy from a fluid medium for use in a waste-water system of a dishwasher, the heat recovery device comprising:
   at least one heat exchanger with at least one heat exchanger surface;
   at least one heating device comprising at least one thermoelectric heat pump or at least one Peltier element, the at least one heating device being thermally coupled to the heat exchanger surface; and
   at least one controller configured to carry out a self-cleaning process for the heat exchanger, the heat exchanger surface being briefly heated by the heating device during the self-cleaning process.

2. The heat recovery device according to claim 1, wherein the at least one controller is configured to heat at least one transportation medium, to which heat, which is drawn from the fluid medium, is transferred to at least one target temperature by the at least one heat pump in at least a normal mode of the heat recovery device.

3. The heat recovery device according to claim 1, wherein the controller is configured to electrically reverse the polarity of the at least one heat pump or the at least one Peltier element during the self-cleaning process.

4. The heat recovery device according to claim 1, further comprising at least one dirt sensor for detecting a degree of soiling of the at least one heat exchanger surface.

5. The heat recovery device according to claim 4, wherein the at least one dirt sensor comprises at least one of the following sensors: an optical dirt sensor; an electrical dirt sensor; a dirt sensor based on an electrical resistance measurement; or a capacitive dirt sensor.

6. The heat recovery device according to claim 4, wherein the at least one dirt sensor comprises at least two temperature sensors, with a temperature of the fluid medium being measured before and after it has flowed through and/or across the heat exchanger, and wherein the at least one dirt sensor is configured to draw a conclusion about a degree of soiling from the difference between the two temperatures.

7. The heat recovery device according to claim 1, wherein the controller is configured to carry out the cleaning process or to automatically carry out the cleaning process, when a predefined degree of soiling is reached or exceeded.

8. A cleaning appliance for cleaning at least one item of washware, the cleaning appliance comprising:
- at least one cleaning chamber for subjecting the washware to an action of at least one cleaning fluid;
- at least one waste-water system for discharging spent cleaning fluid; and
- at least one heat recovery device coupled to the waste-water system and configured to feed recovered heat back to a cleaning process, the heat recovery device comprising:
- at least one heat exchanger with at least one heat exchanger surface;
- at least one heating device, comprising at least one thermoelectric heat pump or at least one Peltier element, that is thermally coupled to the heat exchanger surface; and
- at least one controller configured to carry out a self-cleaning process for the heat exchanger, the heat exchanger surface being briefly heated by the heating device during the self-cleaning process.

9. The cleaning appliance according to claim 8, wherein spent cleaning fluid flows through the heat recovery device continuously or in cycles.

10. The cleaning appliance according to claim 8, wherein the cleaning appliance further comprises at least one rinsing system for subjecting the washware to the action of at least one rinsing fluid, with heat being transferred to the rinsing fluid by the heat recovery device.

11. The cleaning appliance according to claim 8, wherein the cleaning appliance is a conveyor-type dishwasher with at least two cleaning zones through which the washware passes in succession or a commercial single-chamber dishwasher with at least one tank, in particular a boiler, which is separate from the cleaning chamber.

* * * * *